UNITED STATES PATENT OFFICE.

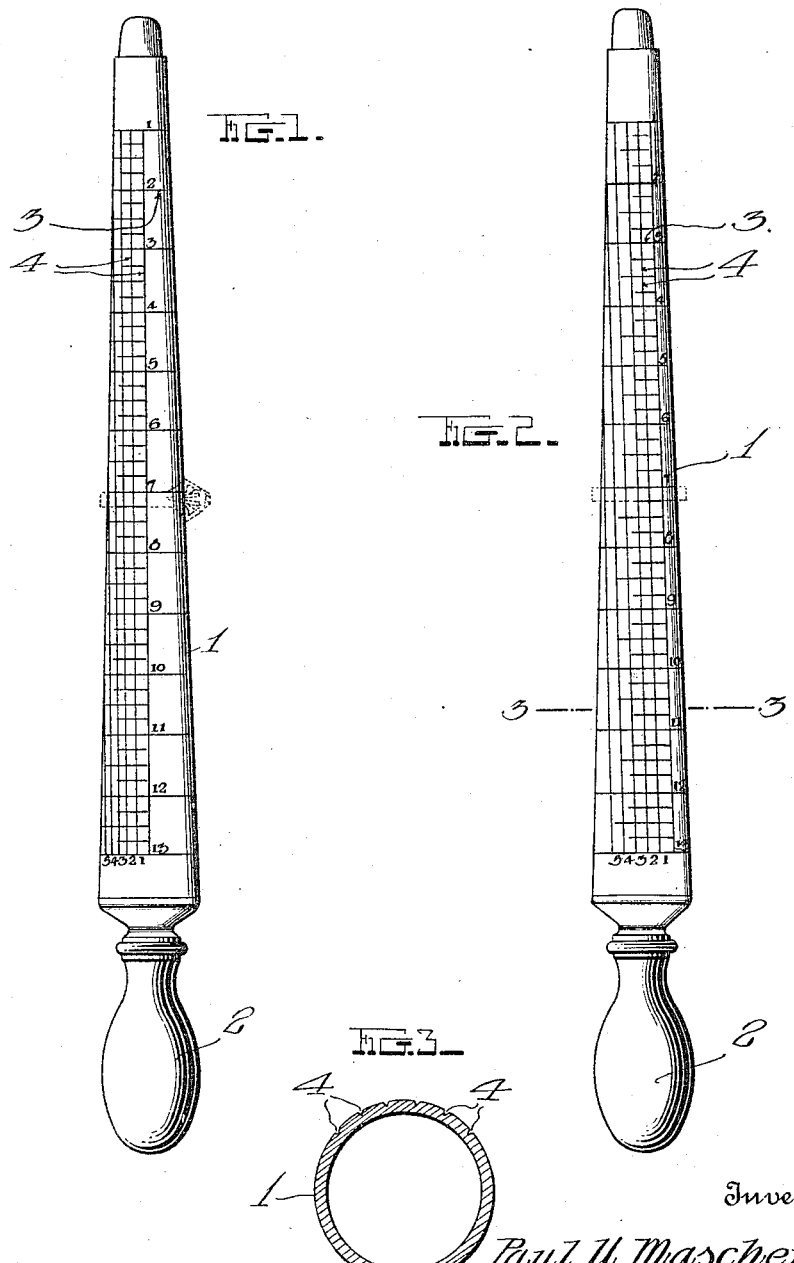

PAUL U. MASCHER, OF EAST PALESTINE, OHIO.

RING-GAGE.

1,210,963.  Specification of Letters Patent.  Patented Jan. 2, 1917.

Application filed January 3, 1916. Serial No. 69,990.

*To all whom it may concern:*

Be it known that I, PAUL U. MASCHER, a citizen of the United States, residing at East Palestine, in the county of Columbiana and State of Ohio, have invented certain new and useful Improvements in Ring-Gages; and I do declare the following to be a full, clear, and exact description of the invention, such as will enable others skilled in the art to which it appertains to make and use the same.

This invention relates generally to geometrical instruments and more particularly to ring gages, and has for its object the provision of a device from which a repairer may ascertain at a glance the exact amount of metal to be cut out of a finger ring when it is desired to reduce it from one known size to another.

With this and other objects in view, the invention consists of certain novel features of construction, combination and arrangement of parts as will be hereinafter fully described and claimed.

In the accompanying drawings in which similar reference numerals designate like parts throughout the several views:—Figure 1 is a side elevation of a device constructed in accordance with this invention; Fig. 2 is a plan view of the same; and Fig. 3 is a sectional view taken on the plane of the line 3—3 of Fig. 2.

Referring more particularly to the drawings, 1 represents a hollow metal rod which is circular in cross section and is tapered from one end to the other. For convenience in handling this hollow metal rod 1 is mounted on a solid wooden or other suitable handle 2.

The outer face of the rod 1 is provided with a scale having any desired number of parts, here shown from 1 to 13 inclusive and with sub-divisions of halves and quarters. This scale is formed by a series of longitudinally spaced transversely extending lines 3, the unit lines extending entirely around the rod, as may be desired. The inner circumference of any finger ring greater than the circumference of the rod at 1 and less than 13 may be accurately determined by trying it upon the rod, and another ring of the same size may be readily selected to correspond therewith by also fitting it upon the rod, thereby avoiding unnecessary handling of the rings.

Arranged on the outer face of the rod 1 is an additional gage composed of a series of parallel lines 4. These lines 4 intersect the transversely extending lines 3 and are spaced apart transversely at each end by a distance equal to the difference in circumference of the rod at any two adjacent unit lines. Six of these lines 4 are shown, one being a zero line and the others being numbered from 1 to 5 inclusive to indicate the difference in circumference between the rod at a certain point and at another point a corresponding number of units away. Thus, for example, the circumference of the rod at 13 is greater than that of the rod at 12 by a distance equal to the distance from the zero line to 1, the circumference at 13 is greater than that at 11 by a distance equal to the distance from the zero line to 2, and so on. By this arrangement, it may be seen that the exact amount which must be cut out of a ring to reduce it from one known size to another may be accurately ascertained. Heretofore, this has been merely guessed at.

Various changes in form and proportion may be resorted to without departing from the spirit of this invention and hence I do not wish to limit myself to the construction herein shown and described other than that set forth in the appended claim.

I claim:—

A ring gage comprising a tapered rod circular in cross section and having a series of parallel spaced transverse lines extending around the same, a zero line extending lengthwise of said rod, and a series of spaced parallel lines extending lengthwise of said rod, the last named lines being arranged also parallel to said zero line and being spaced apart by a distance equal to the difference in circumference of the rod at two adjacent transversely extending lines.

In testimony whereof I have hereunto set my hand in presence of two subscribing witnesses.

PAUL U. MASCHER.

Witnesses:
R. Y. STEVENSON,
J. B. MCGAFFIC.

Copies of this patent may be obtained for five cents each, by addressing the "Commissioner of Patents, Washington, D. C."